United States Patent [19]

Brown

[11] Patent Number: 4,515,684
[45] Date of Patent: May 7, 1985

[54] OIL RECLAMATION PROCESS AND APPARATUS THEREFOR

[75] Inventor: Edward G. Brown, Beverly Hills, Calif.

[73] Assignee: CBM-Oil Reclamation Systems, Inc., Los Angeles, Calif.

[21] Appl. No.: 545,466

[22] Filed: Oct. 26, 1983

Related U.S. Application Data

[63] Continuation-in-part of Ser. No. 310,895, Oct. 13, 1981, abandoned.

[51] Int. Cl.³ ............................................. C10M 11/00
[52] U.S. Cl. ..................................... 208/180; 208/179; 208/188; 210/178; 210/179; 210/256; 210/803
[58] Field of Search ....................... 208/179, 180, 188; 210/178, 179, 255, 256, 803

[56] References Cited

U.S. PATENT DOCUMENTS

| | | | |
|---|---|---|---|
| 1,791,473 | 2/1931 | Grisbaum | 208/179 |
| 3,247,105 | 4/1966 | Gustafson | 210/256 |
| 3,607,721 | 9/1971 | Nagy | 208/188 |
| 3,837,493 | 9/1974 | Liu | 210/256 |
| 4,259,185 | 3/1981 | Mixon | 210/256 |

FOREIGN PATENT DOCUMENTS

| | | | |
|---|---|---|---|
| 111163 | 10/1961 | Pakistan | 210/180 |
| 133415 | 10/1919 | United Kingdom | 208/179 |

Primary Examiner—Delbert E. Gantz
Assistant Examiner—Lance Johnson
Attorney, Agent, or Firm—Christie, Parker & Hale

[57] ABSTRACT

There are provided a process and apparatus for the reclamation of oil from emulsified mixtures of oil, water and particulate solids. Basic to the process is the introduction of the emulsified mixture to undergo reclamation into a settler providing an internal mixing centerwell in communication with a surrounding settling tank at a first temperature. Typically, the surrounding settling tank consists of a cylindrical zone and a conical zone. At a base of the settling zone is an exhaust for sludge and, if desired, water. At the opposed or upper end of the settling zone is a clarified-oil outlet, which is preferably in the form of an annular, peripheral weir. The mixing centerwell has an inlet and outlet for flow of a heating fluid, typically steam; or of a cooling fluid, typically water, therethrough. The emulsion and demulsifying agent are added to the central mixing zone. Agitation is substantially confined thereto. Operation may be on a batch, semi-continuous or continuous basis. Only one settling system is required for batch operation. Two or more settling tanks are operated in series for semicontinuous or continuous operation. Clarified oil is passed to a surge zone operated with a dessicating filter to remove final quantities of solids and water from the oil.

43 Claims, 1 Drawing Figure

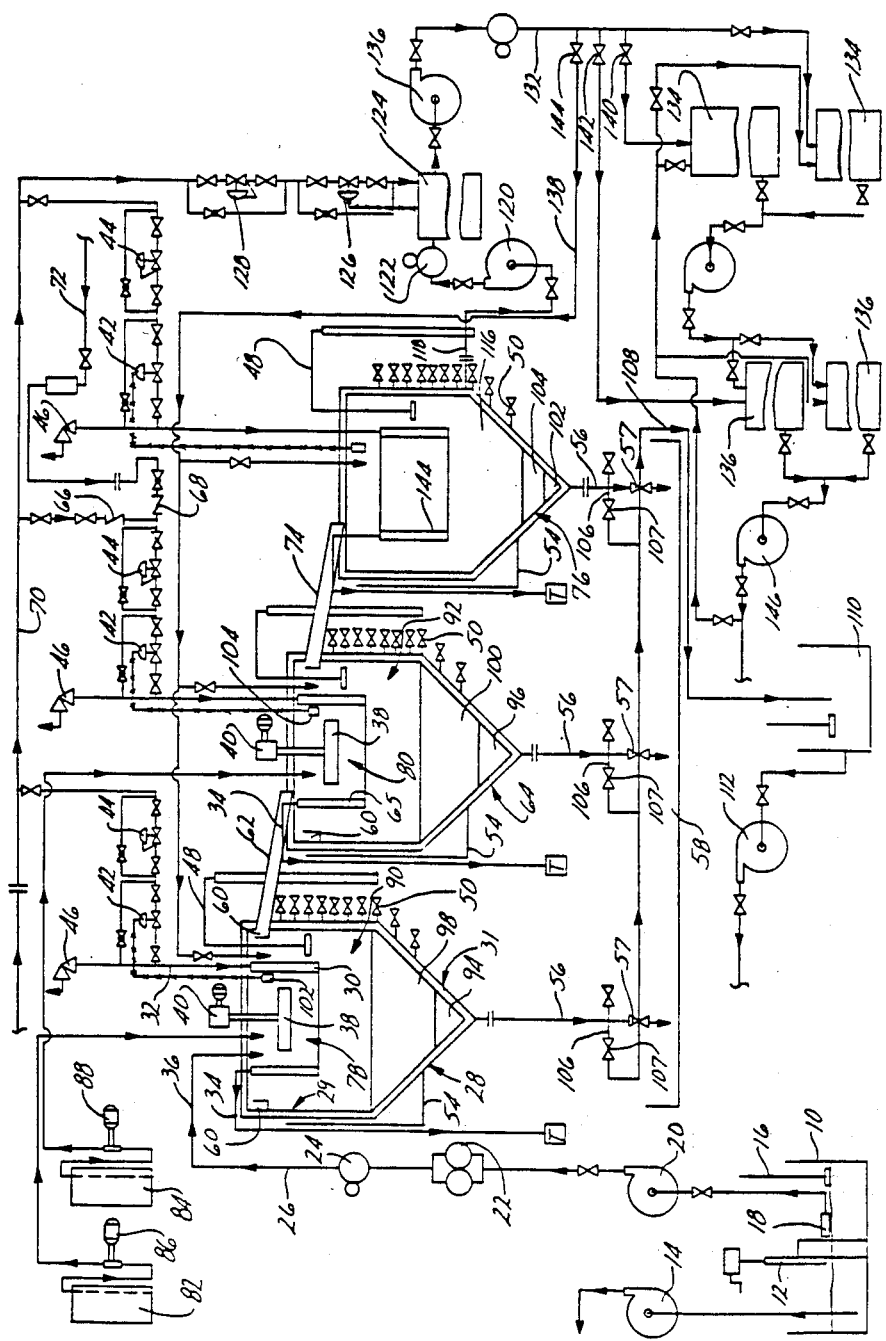

OIL RECLAMATION PROCESS AND APPARATUS THEREFOR

CROSS-REFERENCE TO RELATED APPLICATIONS

This is a continuation-in-part of my application Ser. No. 310,895, filed Oct. 13, 1981 now abandoned.

BACKGROUND OF THE INVENTION

The present invention is related to methods and apparatus for the reclamation of spent oil, including lubricating oils and the like, and is particularly directed to the processing of spent lubricating oils in admixture with water and particulates. One such example is the recovery of lubricating oils from steel-making waste waters. In the manufacture of steel products, water is used for cooling and descaling. Oil used for lubrication purposes is normally, in the processing operations, combined with the solids-containing water. The mix forms stable mechanical and chemical emulsions. The mechanical emulsions are stabilized by suspended solids and the small size of oil droplets. The chemical emulsions are stabilized by electrolytic bonding within the emulsion. While the emulsions can be skimmed from waste water, no effective means has yet been devised to recover the oil. The rising cost of oil products, however, as well as the environmental legislation relating to the quality of waste-water disposal, create both an incentive and a need for oil reclamation. This is the subject of the instant invention.

SUMMARY OF THE INVENTION

According to the present invention, there is provided a process for the reclamation of oil from emulsified mixtures of oil, water and particulate solids. Basic to the process is the introduction of the emulsified mixture to undergo reclamation into a settling tank providing an internal central mixing zone of a given volume in open communication at the base thereof with a surrounding quiescent settling zone at a first temperature. Typically, the surrounding quiescent settling zone consists of a cylindrical zone and a conical zone. At a base of the settling zone is an exhaust for sludge and, if desired, water. At the opposed or upper end of the settling zone is a clarified-oil outlet, which is preferably in the form of an annular peripheral weir. A central mixing zone is formed by an annular indirect heating or cooling zone having an inlet and an outlet for flow of a heating fluid, typically steam; or of a cooling fluid, typically water, therethrough.

In a batch operation, one or more of the settling tanks is filled with the emulsified mixture to undergo purification, each settling tank being at the same or different temperatures. An emulsifying agent is added with agitation, and is preferably provided in a concentration of from 200–4000 ppm. While breaking of the emulsion can occur under ambient conditions, it is particularly preferred that the contents of the settling tank be at an elevated temperature. For primary separation, i.e., separation of the bulk of the oil from the water and solids, the contents of the settling tank can be heated from a temperature of from about 100° F. to the oxidation temperature of the oil. Where a coarse separation is to occur, heating is normally to a temperature in the range of from 120° F. to 200° F. Fine separation normally occurs in a temperature range of from 100° F. to 160° F. A temperature of about 130° F. is particularly preferred, and has been found to accelerate separation of oil from water and solids.

After mixing of the emulsifying agent and indirect heating of the water-oil and solids mixture to its desired temperature, the contents of the settling tank are allowed to settle into a clarified oil phase, a water phase, and a sludge phase. The water is above the sludge. The oil is above the water, but the oil-water interface is maintained below the outlet of the internal central mixing zone. In a batch operation, the oil is displaced, using water, to a surge zone where the oil is stored for final cleanup, if necessary, by dessicating filtration. Final cleanup normally includes high-pressure filtration to remove both water and fine particulates from the oil. This is followed by use of the oil, as such, or by reconstitution by the addition of additives.

The batch mode as described above is substantially used for start-up of semi-continuous and continuous operations.

In the semi-continuous operation, at least two settling tanks, of identical design and function, are used. The emulsion is introduced with heating, as required, to the internal central mixing zone of the first settling zone. The contents of the internal mixing zone of the first settling zone flow downward and displace first clarified oil from the first settling zone to the internal central mixing zone of the second settling zone. This, in turn, displaces oil, by downward flow from the central mixing zone of the second settling zone to the surrounding second settling zone. A corresponding volume of second clarified oil is, in turn, displaced to the oil-surge zone. After addition of demulsifying agent and temperature adjustments, as required, with the first settling zone, preferably being at a temperature of from about 120° F. to about 200° F., and the second at a temperature of from about 100° F. to about 160° F., preferably about 130° F., agitation is stopped. After quiescent separation is allowed to occur, the process is then repeated. The volume introduced is normally a volume equal to the volume of the internal central mixing zone. Less can be added. In the procedure, if the first settling zone is operated at an elevated temperature, water may be introduced in the annular zone forming the central mixing zone of the second settling zone to cool the contents of the settling zone.

The system can also be operated on a continuous basis. In this mode of operation, the emulsion to undergo purification is continuously pumped into the internal central mixing zone of the first settling zone while a surrounding settling zone is maintained substantially quiescent. There, the first clarified oil layer is formed. The process is repeated in the second settling zone, where second clarified oil is formed. At all times, flow is downward from the internal central mixing zone into the settling zone, which displaces fluid in the surrounding settling zone to the following central mixing zone or surge zone, as the case may be. This operation, while having higher throughput, is, of course, less precise in terms of developing highly clarified oil, but still is adequate for many applications.

In each operation, the surge zone also serves the function of a settling zone, where oil can be maintained at any desired temperature; and oil, water and solids are allowed to separate in the process of oil being withdrawn for final processing, i.e., high-pressure, dessicating filtration and, finally, oil reconstitution. In addition, the sequence of flow is always downward from the interior central mixing zone to the surrounding settling zone.

BRIEF DESCRIPTION OF THE DRAWING

The attached drawing schematically illustrates appratus useful in the process of the instant invention.

DETAILED DESCRIPTION

The present invention is directed to an oil reclamation process which is applicable to the processing of oil containing any degree of separable contaminates, and is particularly directed to waste oils which exist in the form of solids-containing emulsions. The invention is also directed to apparatus useful for oil reclamation.

For ease of understanding the invention and the equipment utilized therein, the process will be described in terms of emulsions of spent oil, water and solids.

With reference now to the Drawing, emulsified waste oil, water and solids are delivered to coarse sump 10 containing an adjustable weir for liquid level control, and wherein an initial separation of the emulsion into a primary oil phase and water phase may occur. Emulsified oil, water and solids appear as the floating phase. The clarified water settles and is removed by diaphragm pump 14 for disposal or other treatment. Liquid level is monitored by liquid level gauge 16. The oily emulsion is withdrawn from coarse sump 10 using floating surface pickup 18 and pumped by diaphragm pump 20, optionally through coarse twin-basket filter 22 and metering valve 24 through line 26 to the first settling zone 28.

The upper portion 29 of first settling zone 28 is cylindrical. Settling zone 28 has a conical base 31 and is thermally insulated. There is provided within settling zone 28, a cylindrical centerwell 30, which is preferably of annular, double-walled construction and which serves as an indirect heat exchanger as well as a barrier to control flow of fluids within settling zone 28. As depicted, steam enters the double-walled centerwell 30 by line 32, and exhausts by line 34. The inlet 36 for emulsion undergoing processing is within the perimeter of centerwell 30. To enable agitation, there is provided paddlewheel agitator 38, operated by drive motor 40. Paddlewheel agitator 38 is vertically adjustable in respect of agitation rate and vertical depth of immersion into centerwell 30. Steam flow to the annular concentric walls of centerwell 30 is controlled by thermal-control valve 42, operated in cooperation with pressure-control valve 44. There is provided a steam relief valve 46 for use as required. Liquid level is monitored by liquid level gauge 48, and there may be provided a plurality of taps 50 for sampling of the fluid contained within settling zone 28. Standpipe 54 is provided to facilitate batch operation.

The fluid outlets are sludge line 56, which allows drainage of materials to sludge sump 58 and annular weir 60, which permits passage of clarified oil undergoing reclamation to flow to conduit 62 to centerwell 80 of the second settling zone 64. Settling zone 64 is identical to settling zone 28. Provisions are provided through the use of valves 66 and 68 to add either steam from line 70 or cooling water from line 72 to centerwell 65. This enables the zone 80, contained by centerwell 65, to be used for the purposes of heating or cooling an incoming fluid. Weir 60 of settling zone 64 serves conduit 74, which introduces fluid to the centerwell 114 of surge zone 65, the operation of which will be hereinafter detailed.

The system provided can be operated under batch, semi-continuous- or continuous-flow conditions. In each instance, after clarification within a zone occurs, transfer of fluid from zone to zone is by displacement, caused by downward flow from a centerwell of a settling zone. To this end, the system may be, except where settling zone 64 is utilized to cool the reclaimed oil from settling zone 28 for finer separation, operated using only two zones, namely, settling 28 and surge zone 76. When employed, settling zone 64 may duplicate the operations that occur in settling zone 28, or it may add operations not performed in settling zone 28.

In the batch operation, the waste oil-solids-water emulsion, as previously indicated, is passed through zone 78, the centerwell 30 of settling zone 28, and is caused to flow about the cylindrical centerwell 30, to overflow into weir 60 and zone 80 of centerwell 65 of settling zone 64, and to fill settling zone 64. Metering valve 24 may be conveniently used to determine the prescribed amount of material to undergo separation that is introduced into settling zones 28 and 64, in series. A demuslifying agent, such as saline polyelectrolytes, is metered from reservoirs 82 and 84 by pumps 86 and 88, respectively, into centerwells 78 and 80 of settling zones 28 and 64. The demulsifying agents used are conventional in the art, and the amount can vary widely; but effective results can be achieved at a concentration ranging from about 200 to about 4000 ppm, or the equivalent, to form from about 0.2 to about 4 gallons per 1000 gallons of waste oil undergoing reclamation. The demulsifying agent accelerates water and solids separation from the oil phase. Concurrent with chemical addition, agitation employing agitator 38 and steam, is introduced into the annular spaces of centerwells 30 and 65, which causes the oil to be uniformly heated, thereby reducing viscosity. The agitators 38 of settling zones 28 and 64 are variable in depth of insertion into centerwells 30 and 65 and are agitated sufficiently slowly to prevent the formation of vorteces and to minimize current flow between the region of centerwells 78 and 80 and the surrounding zones 90 and 92. Agitation is sufficiently dynamic to achieve rapid intermixing between the demulsifying agent and the introduced oil, while the surrounding zones are quiescent. This enables the formation of lower sludge layers 94 and 96 and intermediate water layers 98 and 100. Heat provided through steam addition is monitored by thermocouples 102 and 104, which control the operation of temperature-control valves 42. While separation can be achieved without heating, it is, in the preferred embodiment of the invention, desired to provide sufficient heat to heat the oil to a temperature ranging from about 100° F. to the oxidation temperature of the oil being processed. Normally, the temperature will range from about 120° F. to about 200° F. The bulk of the heating is accomplished in zones 78 and 80 within centerwells 30 and 65 by forced convection due to applied agitation of the oil. The heated oil in the surrounding zones 90 and 92 is substantially quiescent, although at a substantially uniform and constant temperature, as controlled by the amount of steam introduced. When the system has achieved its operating temperature and the charge of demulsifying agent has been introduced and thoroughly mixed, agitation is discontinued and quiescent settling is allowed to occur. Temperature is controlled at the predetermined level to prevent oil oxidation and varnish formation. Water separates into zones 98 and 100, and heavy sludge descends into zones 94 and 96. Substantially water-free clarified oil forms zones 90 and 92. Once adequate or desired separation has occurred, the oil is transferred to surge zone 76. Transfer may be by displacement. To this end, water may be introduced to standpipe 54 of settling zone 28, and as water fills the settling zone, oil overflows into the weir and to settling zone 64, which in turn causes overflow of oil into surge zone 76. Because the centerwell 78 divides settling zone 28 into two separate zones, complete oil removal from settling zone 28 would require a syphon in the upper portion of the centerwells 30 and 65. Surge zone 76 will, of course, have the capacity for the amount of oil to be displaced in any one operation. By operating settling zone 28, however, only to displace the amount of oil initially introduced, even the batch operation can enable two stages of purification: a first stage of purification in settling zone 28, and a second stage of purification in settling zone 64, to result in a highly purified oil which is transported to surge zone 76. Both settling zones 28 and 64 and surge zone 76 operate in the batch operation for a certain controlled period of time, which will normally result in a final separation of sludge 102 and a water layer 104 from the stored oil. As required, the sludge is discharged through valves 57 to sump 58. Water is removed from the system by passage through lines 56 to line 106, through valves 107 to 108, and to water sump 110 for passage by pump 112 to a water treatment plant.

The normal mode of operation is semi-continuous. The initial start-up is the same as for the batch mode. However, instead of using water to displace oil from one settling zone to the next, additional oily waste is pumped into centerwell 78 of the first settling zone 28. A volume of oily waste equivalent to the volume of centerwell 78 is transferred from oil sump 10, and by flow of fluid downward from centerwell 78, an equal volume of first clarified oil from zone 90 overflows from the first settling zone 28 to centerwell 80 of second settling zone 64. This, by downward flow of fluid from centerwell 80, in turn, displaces a second clarified oil from zone 92 to surge zone 76 by line 74. In the event that settling zone 64 is not employed, direct transfer to the surge zone 76 occurs. In the semi-continuous mode, the agitators 38 are adjusted at levels within centerwells 30 and 65 to confine mixing in the centerwells, allowing the oil in zones 90 and 92 outside the centerwells to be substantially quiescent, promoting oil-water separation. The emulsifying agent addition and agitation, as well as oil-heating and -cooling, to the extent they are performed, are conducted in the centerwells. To this end, utilization of the agitators 38 during the periods of heat transfer promotes heat transfer and minimizes local hot spots, in addition to mixing of demulsifying agents. When desired operating temperature is reached, the agitators are stopped and the system is allowed to quiescently settle until the desired degree of separation is attained. Oil is displaced and the cycle is repeated.

In the continuous mode of operation, oil is continuously pumped from the sump 10 to centerwell 30 of the first settling zone 28 and the agitators 38 are continuously operated. Flow rate is adjusted to provide residence time for oil in quiescent zones 90 and 92 to achieve the desired degree of separation, with intermittent periods of removal of sludge and water from the system occurring to maintain the oil at desired levels within the settling zones and below centerwells 30 and 65 having oil-water interfaces 91 and 93.

In addition to being operative in a manner identical to the first settling zone 28, the second settling zone 64 is provided with means to introduce cooling water, instead of steam, between the spaced annular walls of centerwell 65.

It has been observed that the rate of separation of water and solids from oil can be accelerated if the system is maintained at a temperature of from about 100° F. to about 160° F., preferably about 130° F. If the oil to be reclaimed is introduced from the first settling zone 28 at a lower temperature, it can be heated. If the oil to be reclaimed is introduced from the first settling zone 28 at a higher temperature, it can be cooled. By consequence of an ability to change oil viscosity, fine tuning of the temperature can optimize the settling rate. Thus, cooling water or steam can be introduced, between the annular walls of centerwell 65, to control the temperature of the emulsion undergoing quiescent separation into water, clarified oil and sludge, at a temperature in the range of from about 100° F. to about 160° F., preferably about 130° F.

Independent of whether separator 64 is operated in a mode identical to or different from settling zone 28, the oil, after processing to the maximum extent possible for separation of solids and water from the oil, is transferred to surge zone 76. Its capacity will depend upon the amount of oil it is to accomodate for any mode of operation of the settling zones it serves. It includes a double-walled annular cylinder 114, identical to the double-walled centerwells used in settling zones 28 and 64, and by the introduction of steam or water through a suitable control system, it enables further quiescent separation to occur, at a constant temperature or with heating or cooling, into a sludge phase 102 or a water phase 104 and a clarified-oil phase 116, which still contains residual amounts of water and solids. Oil is then subjected to final filtration. To achieve this, the oil is withdrawn by line 118 by diaphragm pump 120 and passed to metering totalizer 122 to high-pressure dessicating filtration unit 124. High-pressure dessicating filtration unit 124 preferably contains a dessicating filter medium, such as a cellulosic filter, which is capable of removing fine solids and water from oil. Oil is filtered at an elevated temperature, normally the temperature of surge zone 76, and is controlled through the use of temperature- and pressure-control valves 126 and 128. The filtered oil is then transferred by pump 130 to line 132 to blending zone 134, where additives necessary to reconstitute the oil are added, and/or to storage zones 136 for recycle, as necessary, then to blending zone 134. If the oil is, by analysis, determined to contain too much water and/or particulates as a consequence of the filter medium becoming spent, the oil is returned by line 138 for reprocessing in the settling zones. Control of the destiny of the filtered oil is monitored by control valves 140, 142 and 144. The oil, when of a quality suitable for reuse as lubricating oil, through reconstitution by additive addition, and when of a sufficiently low solids-and-water content, is transferred by final pump 146 to reuse as required.

What is claimed is:

1. A semi-continuous process for reclaiming oil from emulsion mixtures comprising oil, water and particulate solids which comprises:
 (a) providing:
  (i) a first settling tank having a first internal mixing centerwell of a first volume defined by annular inner and outer walls of said first centerwell having flow inlet and outlet for passage of at least a heating fluid therethrough, said first mixing centerwell communicating with a surrounding first settling zone of the first settling tank, said first settling tank having at least an outlet at a base thereof for discharge of at least sludge, and a first oil outlet at the opposite end thereof, said first settling zone of the first settling tank containing sludge at said base, a water layer above said sludge, and a first clarified-oil layer at a first temperature below the oxidation temperature of the oil extending from a first oil-water interface below said first mixing centerwell into said first mixing centerwell and substantially to said first oil outlet;

(ii) a second settling tank having a second internal mixing centerwell of a second volume substantially equivalent to said first volume and formed of a second indirect annular heating or cooling zone defined by annular inner and outer walls of said second centerwell and having a flow inlet and outlet for passage of a heating or cooling fluid therethrough, said second mixing centerwell communicating with a surrounding second settling zone of the second settling tank, said second settling tank having at least an outlet at a base thereof for discharge of at least sludge, and a second oil outlet at the opposite end thereof, said second settling zone containing sludge at said base, a water layer above said sludge, and a second clarified-oil layer at a second temperature below the oxidation temperature of the oil extending from a second oil-water interface below said second mixing centerwell into said second mixing centerwell and at least substantially to said second oil outlet; and (iii) an oil-surge tank comprising a third clarified-oil layer at a third temperature below the oxidation temperature of the oil;

(b) adding an amount of said emulsion mixture to said first mixing centerwell in a quantity sufficient to displace downwardly from the first mixing centerwell, at least a major portion of the first clarified oil contained therein to said first settling zone and discharging a substantially corresponding volume of said first clarified oil from said first settling zone into the first oil outlet and to the second mixing centerwell of said second settling zone and discharging by displacement a substantially corresponding volume of second clarified oil into the second oil outlet and to said oil-surge tank;

(c) adding, with agitation, a demulsifying agent to said first and second mixing centerwells and adjusting the temperature of the introduced emulsion to said first temperature and the oil introduced to said second mixing centerwell to said second temperature when said second temperature is different from said first temperature;

(d) discontinuing agitation and forming in said first settling zone a first clarified-oil layer and in said second settling zone a second clarified-oil layer;

(e) repeating steps (b), (c) and (d);

(f) removing sludge and water from said first and second settling zones to maintain the first oil-water interface below said first mixing centerwell and the second oil-water interface below said second mixing centerwell; and (g) removing the third clarified oil from said oil-surge tank.

2. A process as claimed in claim 1 in which the third clarified oil from said oil-surge tank is passed to a dessicating filter to remove water and particulate solids therefrom.

3. A process as claimed in claim 1 in which the first temperature is above the second temperature and cooling water is introduced to the second indirect heating zone to reduce the temperature of the first clarified oil introduced to said second settling zone to said second temperature.

4. A process as claimed in claim 1 in which the first temperature and the second temperature are substantially the same.

5. A process as claimed in claim 1 in which the first temperature is from about 120° F. to about 200° F.

6. A process as claimed in claim 1 in which the second temperature is from about 100° F. to about 160° F.

7. A process as claimed in claim 1 in which the second temperature of the second settling zone is about 130° F.

8. A process as claimed in claim 1 in which the third temperature is no greater than the second temperature.

9. A process as claimed in claim 1 in which the concentration of the demuslifying agent is independently introduced to the first and second centerwells mixing to a concentration of from about 200 to about 4000 ppm.

10. A process as claimed in claim 5 in which the second temperature is from about 100° F. to about 160° F.

11. A process as claimed in claim 10 in which the concentration of the demuslifying agent is independently introduced to the first and second centerwells mixing to a concentration of from about 200 to about 4000 ppm.

12. A semi-continuous process for reclaiming oil from emulsion mixtures comprising oil, water and particulate solids which comprises:

(a) providing:

(i) a first settling tank having a first internal mixing centerwell of a first volume defined by annular inner and outer walls of said first centerwell and having a flow inlet and outlet for passage of at least a heating fluid therethrough, said first mixing centerwell communicating in open downward flow with a surrounding first settling zone of the first settling tank, said first settling tank having at least an outlet at a base thereof for discharge of at least sludge, and a first annular overflow weir at the opposite end thereof, said first settling zone containing sludge at said base, a water layer above said sludge, and a first clarified-oil layer at a first temperature of from about 120° F. to about 200° F. extending from a first oil-water interface below said first mixing centerwell into said first mixing centerwell and substantially to said first annular overflow weir;

(ii) a second settling tank having a second internal mixing centerwell of a second volume substantially equivalent to said first volume and defined by annular inner and outer walls to define a second indirect annular heating or cooling zone having a flow inlet and outlet for passage of a heating or cooling fluid therethrough, said second mixing centerwell communicating in open downward flow with a surrounding second settling zone of the second settling tank, said second settling tank having at least an outlet at a base thereof for discharge of at least sludge, and a second annular overflow weir at the opposite end thereof, said second settling tank containing sludge at said base, a water layer above said sludge, and a second clarified-oil layer at a second temperature of from about 100° F. to about 160° F. extending from a second oil-water interface below said mixing centerwell into said second mixing centerwell and substantially to said second overflow weir; and (iii) an oil-surge tank comprising a third clarified-oil layer at a temperature of from about 100° F. to about 160° F.;

(b) adding an amount of said emulsion mixture to said first mixing centerwell in a quantity sufficient to displace downwardly from the first mixing centerwell, at least a major portion of the first clarified oil contained therein to said first settling zone and discharging a substantially corresponding volume of said first clarified oil from said first settling tank into the first overflow weir and from the first overflow weir to the second mixing centerwell of said second settling zone and discharging by downward displacement a flow of a corresponding quantity of oil from said second mixing centerwell to said surrounding second settling zone and a substantially corresponding volume of second clarified oil into the second overflow weir and to said oil-surge tank;

(c) independently adding, with agitation, a demulsifying agent to said first and second mixing centerwells to a concentration of from about 200 to about 4000 ppm;

(d) adjusting the temperatures of said emulsion mixture introduced to said first mixing centerwell and of the first clarified oil introduced to said second mixing centerwell, to said second temperature when said second temperature is different from said first temperature;

(e) discontinuing agitation and forming in said first settling zone a first clarified-oil layer and in said second settling zone a second clarified-oil layer;

(f) repeating steps (b), (c), (d) and (e);

(g) removing sludge and water from said first and second settling zones to maintain the first oil-water interface below said first mixing centerwell and the second oil-water interface below said second mixing centerwell; and (h) removing such clarified oil from said oil-surge tank.

13. A process as claimed in claim 12 in which the third clarified oil from said oil-surge tank is passed to a dessicating filter to remove water and particulate solids therefrom.

14. A process as claimed in claim 12 in which the first temperature is above the second temperature and cooling water is introduced to the second indirect heating zone to reduce the temperature of the first clarified oil introduced to said second settling zone to said second temperature.

15. A process as claimed in claim 12 in which the first temperature and the second temperature are substantially the same.

16. A process as claimed in claim 12 in which the second temperature of the second settling zone is about 130° F.

17. A process as claimed in claim 12 in which the third temperature is no greater than the second temperature.

18. A process as claimed in claim 12 in which the first temperature is from about 120° F. to about 200° F.

19. A process as claimed in claim 12 in which the second temperature is from about 100° F. to about 160° F.

20. A process as claimed in claim 17 in which the second temperature is from about 100° F. to about 160° F.

21. A process as claimed in claim 12 in which the concentration of the demuslifying agent is independently introduced to the first and second centerwells mixing to a concentration of from about 200 to about 4000 ppm.

22. A process as claimed in claim 19 in which the second temperature of the second settling zone is about 130° F.

23. A semi-continuous process for reclaiming oil from emulsion mixtures comprising oil, water and particulate solids which comprises:

(a) providing:

(i) a first settling tank having a first internal mixing centerwell of a first volume defined by annular inner and outer walls of said first centerwell and having a flow inlet and outlet for passage of at least a heating fluid therethrough, said first mixing communicating in open downward flow with a surrounding first substantially quiescent settling tank, said first settling tank having at least an outlet at a base thereof for discharge of at least sludge, and a first weir at the opposite end thereof, said first settling tank containing sludge at said base, a water layer above said sludge, and a first clarified-oil layer at a first temperature below the oxidation temperature of the oil extending from a first oil-water interface below said first internal mixing centerwell into said first mixing centerwell and substantially to said first weir;

(ii) a second settling tank having a second internal mixing centerwell of a second volume defined by annular inner and outer walls of said second centerwell and a heating or cooling zone having a flow inlet and outlet for passage of a heating or cooling fluid therethrough, said second mixing centerwell communicating in open downward flow with a surrounding second substantially quiescent settling zone of the second settling tank, said second settling tank having at least an outlet at a base thereof for discharge of at least sludge, and a second weir at the opposite end thereof, said second settling tank containing sludge at said base, a water layer above said sludge, and a second clarified-oil layer at a second temperature below the oxidation temperature of the oil extending from a second oil-water interface below said second mixing centerwell into said second mixing centerwell and at least substantially to said second weir; and (iii) an oil-surge tank comprising a third clarified-oil layer at a third temperature below the oxidation temperature of the oil;

(b) continuously adding, with agitation, a demulsifying agent and an amount of emulsion mixture to said first mixing centerwell in a quantity sufficient to displace downwardly from the first mixing centerwell, at least a major portion of the contents therein to said surrounding first substantially quiescent settling zone while adjusting the temperature of the agitated emulsion to said first temperature using the first indirect annular heating zone formed by the walls of the first centerwell while maintaining agitation substantially confining to said first mixing centerwell to maintain said first substantially quiescent settling zone to form a first clarified oil in said first settling zone and discharging a corresponding volume of first clarified oil from said first settling zone to the first weir and to the second mixing centerwell of said second settling and discharging by downward flow from said second mixing centerwell to said second settling zone and by displacement from said second settling zone a substantially corresponding volume of second clarified oil into the second weir to the oil-surge tank;

(c) continuously adding, with agitation, a demulsifying agent to said second mixing centerwell and adjusting the temperature of said introduced first clarified oil to said second temperature by introduction of a heating or cooling fluid to the space between the inner and outer walls defining the second centerwell when said second temperature is different from said first temperature while substantially confining agitation to said second mixing centerwell to maintain the surrounding second substantially quiescent settling zone to form said second clarified-oil layer;

(d) removing third clarified oil from said oil-surge tank; and (e) removing sludge and oil from said first and second settling zones to maintain said first and second oil-water interfaces below said first and second mixing centerwells.

24. A process as claimed in claim 23 in which the clarified oil from said oil-surge tank is passed to a desicating filter to remove water and particulate solids therefrom.

25. A process as claimed in claim 23 in which the first temperature is above the second temperature and cooling water is introduced to the second indirect heating zone to reduce the temperature of first clarified oil introduced to said second settling zone to said second temperature.

26. A process as claimed in claim 23 in which the first temperature and the second temperature are substantially the same.

27. A process as claimed in claim 23 in which the first temperature is from about 120° F. to about 200° F.

28. A process as claimed in claim 23 in which the second temperature is from about 100° F. to about 160° F.

29. A process as claimed in claim 23 in which the second temperature of the second settling zone is about 130° F.

30. A process as claimed in claim 23 in which the third temperature is no greater than the second temperature.

31. A process as claimed in claim 23 in which the concentration of the demulsifying agent is independently introduced to the first and second centerwells mixing to a concentration of from about 200 to about 4000 ppm.

32. A process as claimed in claim 30 in which the second temperature is from about 100° F. to about 160° F.

33. A process as claimed in claim 32 in which the concentration of the demulsifying agent is independently introduced to the first and second centerwells mixing to a concentration of from about 200 to about 4000 ppm.

34. A continuous process for reclaiming oil from emulsion mixtures comprising oil, water and particulate solids which comprises:

(a) providing:

(i) a first settling tank having a first internal mixing centerwell of a first volume defined by annular inner and outer walls of the first centerwell and having a flow inlet and outlet for passage of a heating fluid therethrough, said first mixing centerwell in open downward communication with a surrounding first settling zone of the first settling tank, said first settling tank having at least an outlet at a base thereof for discharge of at lest sludge and a first annular overflow weir at an opposite end thereof, said first settling tank containing sludge at said base, a water layer above sludge, and a first clarified-oil layer at a first temperature of from about 120° F. to about 200° F. extending from a first oil-water interface below said annular overflow weir;

(ii) a second settling tank having a second internal mixing centerwell of a volume substantially equivalent to said first volume defined by annular inner and outer walls of the second centerwell and having a flow inlet and outlet for passage of a heating or cooling fluid therethrough, said second mixing centerwell in open downward communication with a surrounding second settling zone of the second settling tank, said second settling tank having at least an outlet at a base thereof for discharge of at least sludge and a second annular overflow weir at opposite ends thereof, said second settling zone containing sludge at said base, a water layer above said sludge, and a second clarified-oil layer at a second temperature of from about 100° F. to about 160° F. extending from a second oil-water interface below said second mixing and substantially to said second annular overflow weir;

(iii) an oil-surge tank containing a third clarified-oil layer at a third temperature of from about 100° F. to about 160° F.;

(b) continuously adding, with agitation, an amount of emulsion mixture to said first mixing centerwell in a quantity sufficient to displace at least a major portion of the first clarified oil contained therein from the first mixing centerwell in downward flow to said first settling zone, substantially without disturbing settling in the first settling zone, and discharging a substantially corresponding volume of first clarified oil into the first annular overflow weir and to the second mixing centerwell of said second settling tank and discharging a substantially corresponding volume of oil from said second mixing centerwell in downward flow to said settling tank and a substantially corresponding volume of second clarified oil from said second settling zone into the second annular overflow weir and to the oil-storage tank;

(c) continuously adding, with agitation, a demulsifying agent to said first and second mixing centerwells and adjusting the temperature of said introduced first clarified oil to said second temperature by introduction of a heating or cooling fluid to said second annular heating zone when said second temperature is different from said first temperature while substantially confining agitation to said first and second mixing centerwells to maintain the surrounding first and second settling means substantially quiescent to form said first and second clarified-oil layers;

(d) removing third clarified oil from said oil-surge tank; and (e) removing sludge and oil from said first and second settling zones to maintain said first and second oil-water interfaces below said first and second mixing centerwells.

35. A process as claimed in claim 34 in which the clarified oil from said oil-surge tank is passed to a dessicating filter to remove water and particulate solids therefrom.

36. A process as claimed in claim 34 in which the concentration of the demulsifying agent is independently introduced to the first and second centerwells mixing to a concentration of from about 200 to about 4000 ppm.

37. A batch process for reclamation of oil from emulsified mixtures of oil, water and particulate solids which comprises:

(a) providing at least one settling tank having an internal mixing centerwell formed of an indirect annular heat exchange zone defined by annular inner and outer walls of the first centerwell and having a fluid inlet and outlet for passage of a heating or cooling fluid therethrough, in open downward flow communication with a surrounding quiescent settling zone of the first settling tank;

(b) at least substantially filling said settling zone with said emulsified mixture;

(c) introducing flow of a heating fluid to said annular heating zone to internally heat the contents thereof to a predetermined temperature below the oil-oxidation temperature, with agitation, substantially confined to said mixing centerwell while adding a demulsifying agent to said mixing centerwell in a quantity sufficient to cause demulsification of the emulsified mixture of oil, water and particulate solids;

(d) discontinuing agitation and forming from the demulsified emulsion a clarified-oil phase, a water phase, and a sludge phase; and (e) water-displacing the clarified oil from the settling zone to an oil-surge tank.

38. A process as claimed in claim 37 in which the third clarified oil from said oil-surge tank is passed to a dessicating filter to remove water and particulate solids therefrom.

39. A process as claimed in claim 37 in which the temperature is from about 100° F. to about 200° F.

40. A process as claimed in claim 37 in which the concentration of the demulsifying agent is from about 200 to about 4000 ppm.

41. A system for reclaiming oil from emulsion mixtures comprising oil, water and particulate solids which comprises:

(a) at least one insulated settling tank having:
 (i) a removable lid, a vertically-oriented internal mixing centerwell of a given volume forming indirect heat exchange having at least two connected concentric cylindrical annular surfaces having a fluid inlet and outlet for passage of at least a heating fluid therethrough, said mixing centerwell extending downward from the lid communicating in open downward flow relation with an annularly surrounding settling zone of the settling tank formed of a cylindrical side and a conical base having an outlet for discharge of at least sludge and a first internal annular overflow weir at the upper end of said cylindrical side adjacent the removable lid; and
 (ii) agitation means adjustably extending into said vertically-oriented internal mixing centerwell, said agitation means having a vertically-adjustable agitator for control of agitator extension into the vertically-oriented mixing centerwell for selectively confining agitation to said mixing centerwell;

(b) means to introduce emulsion mixtures and demulsifying agent to said vertically-oriented mixing centerwell;

(c) a surge tank in flow communication with said annular overflow weir and internal means for heating or cooling the contents thereof.

42. A system for reclaiming oil from emulsion mixtures comprising oil, water and particulate solids which comprises:

(a) a first insulated settling tank having:
 (i) a removable first lid, a vertically-oriented internal mixing centerwell of a first volume formed of indirect heat exchange having at least two connected concentric cylindrical annular surfaces having a fluid inlet and outlet for passage of at least a heating fluid therethrough, said mixing centerwell extending downward from the lid communicating in open downward flow relation with an annularly surrounding settling zone of the first settling tank formed of a cylindrical side and a conical base having an outlet for discharge of at least sludge and a first internal annular overflow weir at the upper end of said cylindrical side adjacent the removable lid; and
 (ii) first agitation means adjustably extending into said vertically-oriented internal mixing centerwell, said agitation means having a vertically-adjustable agitator for control of agitator extension into the vertically-oriented mixing centerwell for selectively confining agitation to said mixing centerwell;

(b) means to introduce emulsion mixtures and demulsifying agent to said first vertically-oriented mixing centerwell (c) a second insulated setting tank having:
 (i) a removable lid, a second vertically-oriented internal mixing centerwell of a second volume formed of an indirect heat exchange having at least two connected concentric cylindrical annular surfaces having a fluid inlet and outlet for passage of heating or cooling fluid therethrough, said second mixing centerwell extending downward from the second lid communicating in open downward flow relation with an annularly-surrounding settling zone of said second settling tank and formed of a cylindrical side and a conical base having an outlet for discharge of at least sludge and a second internal annular overflow weir at the upper end of said cylindrical side adjacent the removable lid; and
 (ii) second agitation means extending into said vertically-oriented mixing centerwell, said agitator means having a vertically-adjustable agitator for control of agitator extension into the vertically-oriented mixing centerwell for selectively confining agitation to said mixing centerwell;
(d) means connecting said first annular overflow weir in flow relation to said vertically-oriented mixing centerwell of said second settling tank;
(e) means to introduce a demulsifying agent to said vertically-oriented mixing centerwell of said second settling tank; and
(f) a surge tank having an inlet in flow communication with said second annular overflow weir and having internal means and an outlet for heating or cooling the contents thereof.

43. The system of claim 42 further comprising a dessicating-pressure oil-filtration means in flow communication with the outlet of said surge tank.

* * * * *